July 20, 1965     C. W. PFLIEGER     3,195,854

VALVE FOR NITROGEN COOLING SYSTEM

Filed Feb. 20, 1962

INVENTOR.
CHARLES WILLIAM PFLIEGER
BY John P. Murphy
ATTORNEY

United States Patent Office 3,195,854
Patented July 20, 1965

3,195,854
VALVE FOR NITROGEN COOLING SYSTEM
Charles William Pflieger, New Hartford, N.Y., assignor to The Partlow Corporation, New Hartford, N.Y., a corporation of New York
Filed Feb. 20, 1962, Ser. No. 174,487
3 Claims. (Cl. 251—61)

This invention relates to the use of liquid nitrogen as a cooling agent for subzero environmental chambers and more particularly relates to a valve for the express purpose of controlling nitrogen which will operate at the extremely low temperature necessary in such use.

The use of liquid nitrogen as a cooling agent for subzero environmental chambers etc., has long been recognized as practical and in certain respects has several advantages over other methods, such as mechanical refrigeration.

Most recent developments include systems for cooling transport units, such as rail cars, truck and piggyback units for transporting perishable goods. These units require some type of temperature control.

Electric controls employing a solenoid valve and a battery operated thermostat have been used with a measure of success; however, the very low temperature of the nitrogen being injected into the chamber, —320° F., causes undesirable swings in temperature because too much liquid to maintain the set temperature is fed into the chamber before the thermostat senses the temperature change to shut it off. Therefore, a modulating system is desirable.

A type of pneumatic control employing a valve actuated by a thermostat is described in our co-pending application, Serial No. 853,184, which is now abandoned. This control is capable of emitting an air signal in direct proportion to the temperature response of a mercury filled thermostat in a 3 to 15 lb. range and is capable of controlling signals as high as 100 lbs. pressure. This control may be an indicating control or a recording control, as required. While this control was available, a suitable valve was needed for use with liquid nitrogen.

Standard air-operated valves with a packed stem and rubber or fabric diaphragms are not operable for this purpose as the exposed moving parts collect moisture and freeze at the —320° F. temperature that the valve body is subjected to.

It is therefore an object of the invention to provide a control system for liquid nitrogen refrigeration and other conditions of extreme low temperature which will overcome the above-mentioned disadvantages.

Another object of the present invention is to provide a valve which will not freeze.

Still another object of the invention is to provide a completely self-powered throttling control system for liquid nitrogen refrigeration which utilizes available surplus nitrogen gas for control power.

Another object of the invention is to provide a seal, keeping gas from escaping to the outside without the use of a stuffing box or sliding stem.

Another object of the invention is to provide a valve which will open and close in response to changes in temperature occurring inside a given space.

Another object of the invention is to provide a valve which will allow a certain amount of nitrogen gas to bleed to the atmosphere, thereby maintaining a certain positive pressure in order to prevent moisture from being drawn in to the valve and freeze the moving parts.

Another object of the invention is to provide a valve which can be used with an anhydrous medium, as well as with steam, water or other fluid.

Yet another object of the invention is to provide an instrument to modulate the pressure of the nitrogen gas through a controller and to provide an output pressure signal in direct proportion to the temperature response of the element in a 3 to 15 pound range, as well as being capable of controlling signals as high as 100 pounds pressure.

The above-mentioned objects are accomplished by the present invention, which is a novel valve system in which the valve and valve stem are supported solely by a bellows seal which allows the movement necessary to open and close the valve which is held in a normally closed position by a proper spring and cap at the end of the valve stem; a power bellows and cup assembly being mounted on top of the valve body.

Figure 1:
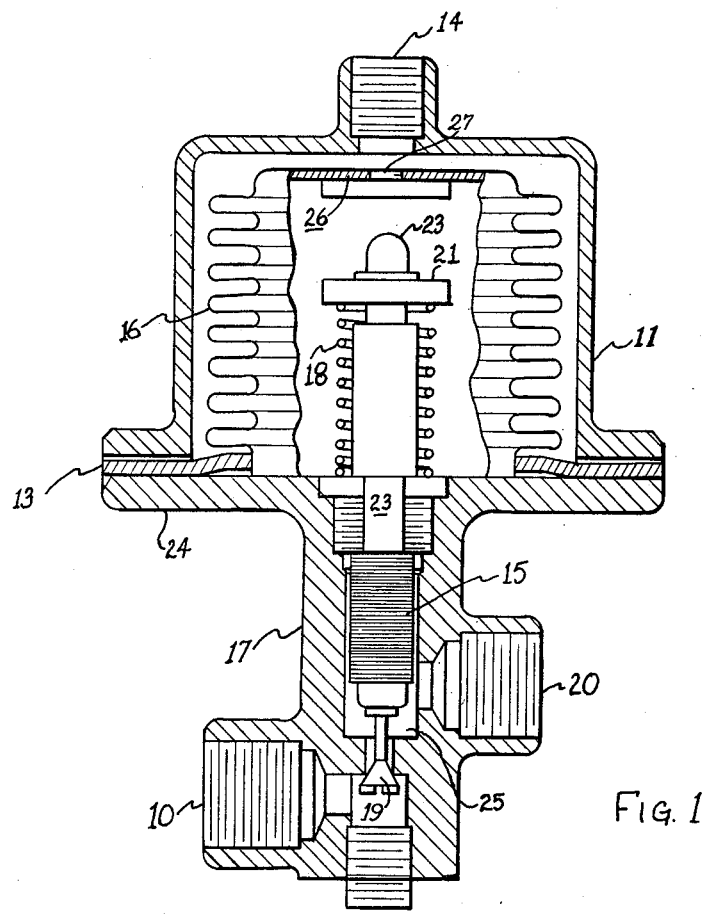
FIGURE 1 is a side view of the invention, taken in cross-section and showing the several working parts and their relationship to each other.
Figure 2:
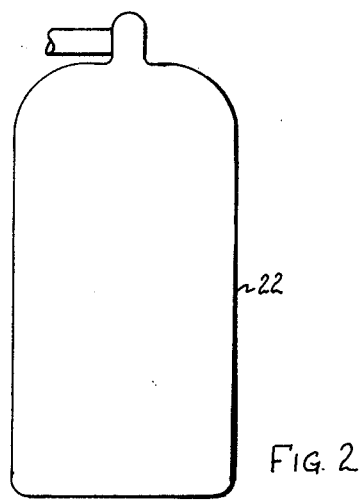
FIGURE 2 is a side view of a cylindrical pressure container for fluid; either liquid or gas.

The valve, as seen in FIGURE 1, has an inlet 10 for liquid nitrogen and an outlet 20, the liquid nitrogen going from the inlet into chamber 25 in which a bellows seal 15 is mounted to valve body 24 and supports the valve 19 and the valve stem 23 which are preferably constructed of brass or other non-corrosive material and are independent of the valve body 24. The bellows seal 15 allows the movement necessary to open and close the valve which is held in a normally closed position by a proper spring 18 and cap 21 at the end of the valve stem. A power bellows 16 and cup assembly 11 are mounted on top of the valve body 24. Any gasket seal 13 may be provided between the cup assembly 11 and body 24.

When gas pressure is admitted to the cap assembly 11, from a temperature control attached as at 14, it forces the power bellows downward, opening the valve. A small port 27 in the top of the power bellows 16 allows a small amount of nitrogen gas to enter the inside of the power bellows and bellows seal. Although the introduction of gas pressure inside the power bellows 16 would tend to equalize the external and internal pressures, the ratio of the area of port 27 to the overall area of the bellows 16 which is acted upon by gas pressure is such that only a very slight amount of pressure enters the port 27 before the bellows 16 moves downwardly; such that the top end of valve stem 23 is contacted by plate 26. It will be seen that, upon contact by plate 26, the end of stem 23 partially enters port 27 to prevent further admittance of gas pressure therein. This gas in turn bleeds to the atmosphere and keeps the assembly free from moisture, thereby preventing freezing of moving parts regardless of the extreme low temperature encountered.

In the preferred embodiment, the spring pressure on the valve stem and the spring rate of the power and sealing bellows are arranged so that 5 pounds of gas pressure are required in the cup to open the valve. 6½ pounds of pressure are required to open the valve to full capacity. Therefore, a control signal of 5 lbs. to 6½ lbs. will open or close the valve. When connected to the pneumatic control using nitrogen gas at 10 lbs. pressure, it can be seen that very sensitive control of the valve can be had.

A modulating range adjustment in the control gives the operator a choice of selecting the proper modulation range of the valve to meet the input requirements of his particular installation.

In actual operation, the instrument is piped to the nitrogen gas supply available in the top of the nitrogen tank. In response to the action of a thermal element, the instrument modulates the pressure of the nitrogen gas through the controller and provides an output pressure signal in direct proportion to the temperature response of the element in a 3 to 15 pound range. It is also capable of controlling signals as high as 100 pounds pressure.

The controller is equipped with an adjustable throttling range from 5% to 20% of scale range. This permits the controller to be fitted to the requirements of the system until virtually a straight line temperature control is achieved. A manual reset adjustment is also incorporated in the mechanism.

The output of the control is piped to the subject valve, which is expressly designed to overcome the problems usually associated with the handling of nitrogen in its liquid state. The valve body 24 is preferably made of Phosphor bronze. The valve and valve stem 23 are preferably of brass.

The temperature control connected at 14 operates to allow the valve to close off, thereby shutting off the flow of gas at a certain low temperature. When the temperature raises to a certain point again, the valve is reopened.

In actual operation, with the control set at high temperature, possibly 70° F.; and with the temeprature control set for 0° F. and in position, the output signal to the valve would be 10 lbs. The power bellows 16 is therefore driven down, contacting the end of the valve stem 23 and opening the valve 19 at 10 lbs. pressure, the descending action forcing the stem open and opening the valve 19. A large power bellows pressure plate 26 is formed inside the bellows for the stem to ride on. As the control point is approached, at about 10° above zero, this pressure would start to reduce so that as soon as the pressure reached 5 lbs., the valve would be closed. A slight increase in pressure would just start to open the valve.

Due to the throttling action of the control when it is set at zero pressure, it will find a point where just enough pressure will be maintained in the dome to feed the right amount of liquid nitrogen through the inlet to maintain that temperature. If the temperature in the unit started to drop further, the pressure would be reduced and the valve would close more.

In theory the valve should never close absolutely since it should always take a certain amount of nitrogen to maintain a certain set temperature.

The valve stem can be seen to be considerably smaller than the bellows itself and there are no guides or sliding members whatever. The spring simply pulls the stem up so that it is free to float and the valve is therefore open. Also there is no moisture in the system and no freezing results.

A conventional type of valve might be adapted to this invention by drilling an orifice at the top of the cup assembly 11. It is important to allow a certain amount of nitrogen gas which is enclosed in the chamber to bleed. The nitrogen gas in the inside of the assembly which in turn bleeds to the atmosphere does maintain a certain pressure so that when the bellows comes up, no moisture is drawn into the moving parts.

If the valve were attempted to be operated with air, moisture would accumulate and the valve would freeze up almost instantly. However, an anhydrous medium could be used without this ill effect.

The valve section in the preferred embodiment will handle 120 pounds, although in nitrogen systems pressures of over 60 pounds seldom occur.

Hereinabove we have described and illustrated our invention in connection with certain specific embodiments. It will be obvious that this invention, and the novel teaching described therein, may be embodied or incorporated in other forms and modifications. All such variations are, of course, contemplated.

I claim:

1. A moisture-free valve for liquid nitrogen refrigeration comprising a valve body, a cup assembly mounted on said valve body and a valve system within said cup assembly and said valve body; said valve system comprising a valve stem, a bellows seal supporting said valve stem in said body and a spring mounted on said valve stem, said spring being disposed between said body and said valve stem, said spring being otherwise free-riding; said valve body having an inlet and an outlet thereto; said cup assembly having a power bellows mounted therein operable against said valve stem, said power bellows having a small port in the top thereof and being adapted to be operated by a temperature control; all aforesaid internal parts being sealed against air-contact.

2. A low temperature valve for use with nitrogen refrigeration systems, said valve comprising a valve body defining a chamber, a valve stem, a bellows seal supporting said valve stem in said chamber and a spring at the end of said valve stem opposite said bellows seal; said valve body being formed with an inlet and an outlet thereto and a power bellows and cup assembly being mounted on top of said valve body, said power bellows having an opening therein for admitting gas therein and excluding air, said power bellows being operable against said valve stem for opening and closing said valve.

3. A moisture free valve to control nitrogen comprising a valve body, a chamber formed in said body and an inlet and outlet to said chamber, a seal bellows attached in said chamber, a valve stem and valve carried by said seal bellows, a cup assembly mounted on said valve body, a power bellows disposed in said cup assembly, the end of said valve stem extending into said power bellows, said power bellows being adapted to be operated by gas pressure against said valve stem for opening and closing said valve, and a port being formed in said power bellows for admitting gas into said bellows; thereby excluding air from said bellows.

References Cited by the Examiner

UNITED STATES PATENTS

| | | |
|---|---|---|
| 2,111,230 | 3/38 | Toussaint. |
| 2,158,715 | 5/39 | Beekley et al. _____ 251—61.1 XR |
| 2,371,428 | 3/45 | De Giers et al. _____ 236—82 XR |
| 2,743,738 | 5/56 | Johnson _____ 251—335.2 XR |
| 2,917,268 | 12/59 | Soderberg et al. _____ 236—80 XR |
| 2,943,459 | 7/60 | Rind _____ 62—514 XR |
| 2,983,107 | 5/61 | Forrest _____ 62—514 XR |
| 2,988,898 | 6/61 | Hesson et al. _____ 62—514 XR |

FOREIGN PATENTS 592,958   2/34   Germany.

M. CARY NELSON, *Primary Examiner.*

ALDEN D. STEWART, ISADOR WEIL, *Examiners.*